Feb. 14, 1961 R. W. FABERÉ ET AL 2,971,595
DUAL RANGE TWO AND FOUR WHEEL DRIVE FOR VEHICLES
Filed May 11, 1959 2 Sheets-Sheet 1

INVENTORS
RAYMOND W. FABERÉ
KARL J. MOGK
BY
Fryer and Johnson
ATTORNEYS

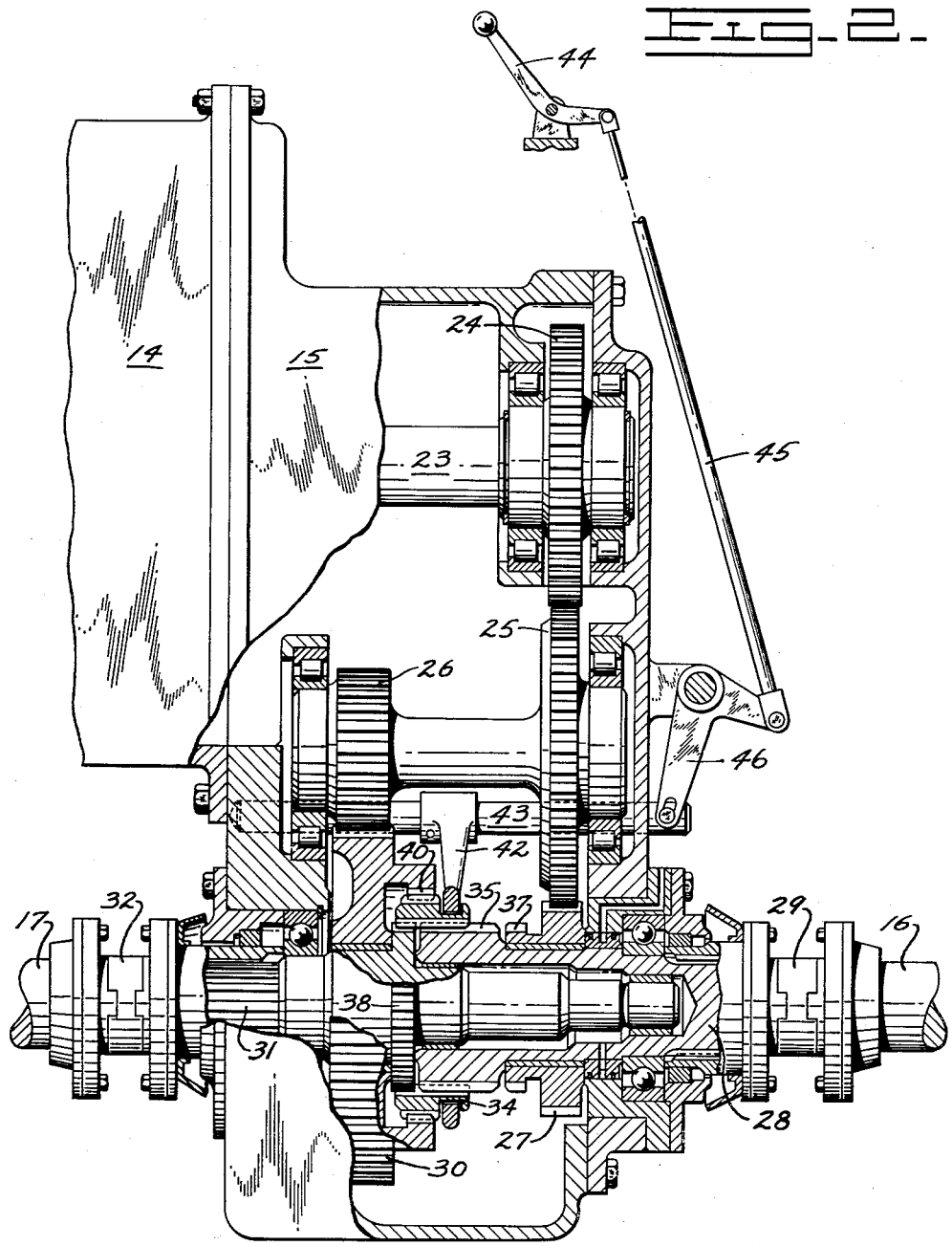

United States Patent Office 2,971,595
Patented Feb. 14, 1961

2,971,595

DUAL RANGE TWO AND FOUR WHEEL DRIVE FOR VEHICLES

Raymond W. Fabere and Karl J. Mogk, Naperville, Ill., assignors to Caterpillar Tractor Co., Peoria, Ill., a corporation of California Filed May 11, 1959, Ser. No. 812,442

2 Claims. (Cl. 180—49)

This invention relates to vehicles having a selective two or four wheel drive with a low gear ratio employed for the four wheel drive and a high gear ratio employed for the two wheel drive.

Conventional dual range two and four wheel drive mechanisms employ more than a single operator's lever so arranged that a shift from low to high range must be accompanied by a separate shift from four wheel drive to two wheel drive. Unless both shifts are made all four wheels may be driving in high range causing unnecessary friction and undesirable wear in the drive train in one set of wheels.

The most desirable practice is to use all four wheels for driving in the low range only and to shift to two wheel drive immediately upon commencing to drive in high range.

It is, therefore, the object of the present invention to provide a vehicle drive mechanism with a dual range two and four wheel drive wherein a shift from one range to another automatically accomplishes a change from one drive to the other eliminating the necessity for a second shift lever and a second shifting operation.

Further and more specific objects and advantages and the manner in which the invention is carried into practice are made apparent in the following specification by reference to the accompanying drawings.

In the drawings:

Fig. 2 is an enlarged fragmentary view with parts broken away and partially in section showing the drive mechanism of the present invention.

Figure 1:
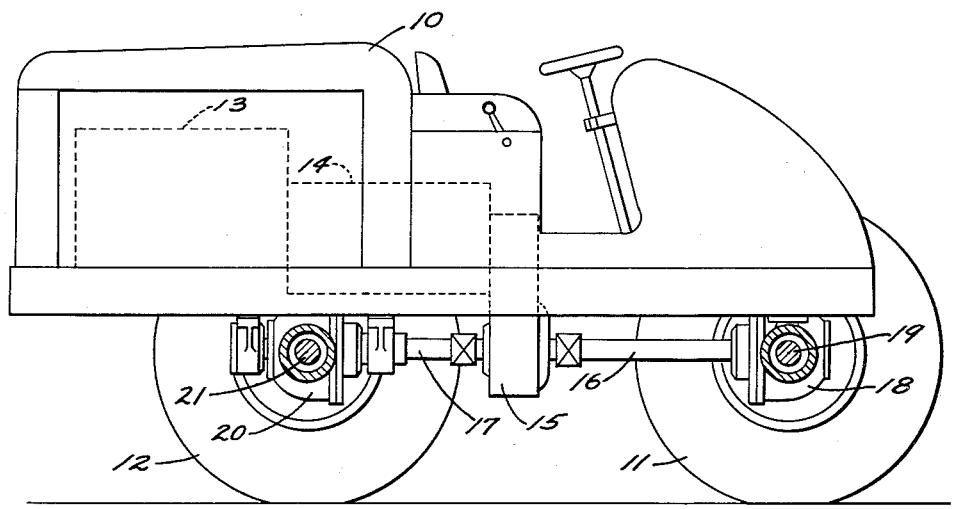
Fig. 1 is a schematic view in side elevation of a tractor with the wheels on the near side removed showing the axles and axle housing in section.

As an example of one type of vehicle in which the invention may be employed, a tractor 10 is shown in Fig. 1 as having front wheels 11 and rear wheels 12. The position of the tractor engine is indicated in dotted lines at 13 and the position of a conventional transmission is shown at 14. An auxiliary transmission or dual range two and four wheel drive mechanism is shown at 15. Power from the engine is directed through this mechanism either to a front wheel drive shaft 16 alone or a rear wheel drive shaft 17 together with the front wheel drive shaft. A front axle differential in the housing 18 transmits power to the front axles 19 and a similar differential 20 transmits power to the rear axle 21.

The mechanism of the present invention is illustrated in Fig. 2 wherein the housing 15 is illustrated as connected with the main transmission 14, the output shaft of which is shown at 23 as entering the housing 15 and carrying a gear 24. The gear 24 is in mesh with a high range gear 25 of a rotatable cluster which also includes a low range gear 26. The high range gear 25 meshes with a gear 27 which is rotatably mounted on a hollow front wheel output shaft 28 connected through a conventional coupling 29 with the front wheel drive shaft 16. The low range gear 26 is in mesh with a gear 30 rotatably mounted on a rear wheel output shaft 31 which is connected by a coupling 32 with the rear drive shaft 17.

In order to impart a drive in high range to the front wheels only or in low range to the front and rear wheels, a sliding clutch collar 34 with both internal and external clutch teeth is slidably mounted in toothed engagement with clutch teeth 35 formed externally of the front wheel output shaft 28. The gear 27 which meshes with the high range gear 25 also carries a set of external clutch teeth 37 which are alignable with the teeth 35 on the front wheel output shaft. A similar set of clutch teeth 38 alignable with the clutch teeth 35 is carried by the rear wheel output shaft 31. The gear 30 which meshes with the low range gear 26 carries a set of internal clutch teeth 40 adapted to mesh with external clutch teeth on the clutch collar 34.

To shift the clutch collar 34, a yoke 42 loosely fitting a groove in the clutch collar is secured to a slidable control shaft 43 which is operated by a single control lever 44 connected with the control shaft by suitable means illustrated as a link 45 and a bellcrank 46.

Figure 3:
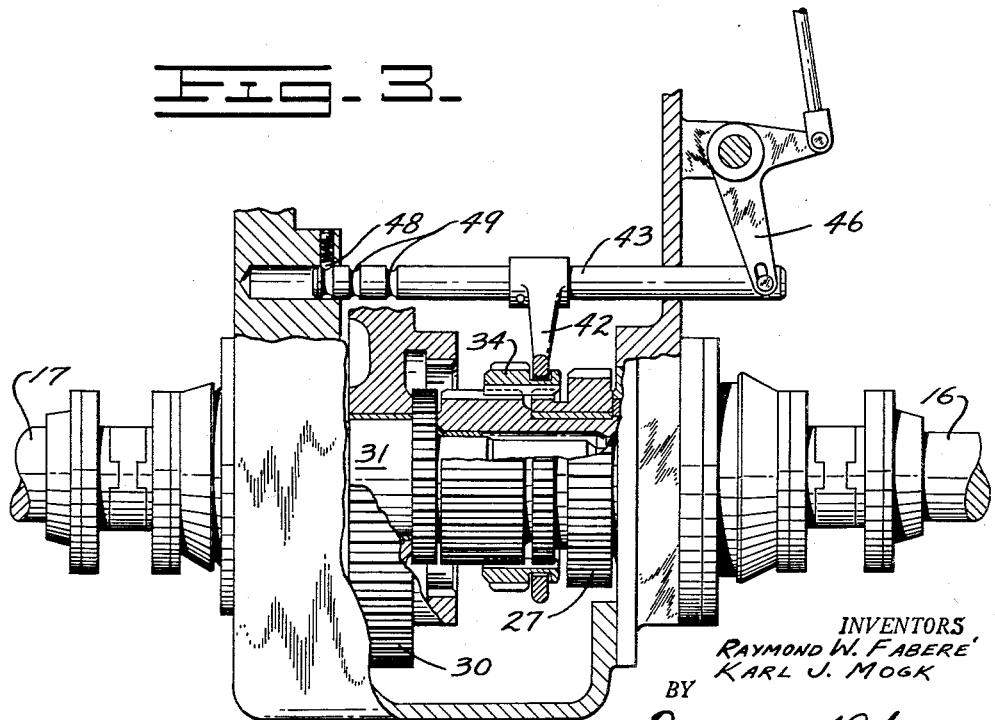
Fig. 3 is a fragmentary view of a portion of the mechanism illustrated in Fig. 2 illustrating the parts in a different operating position.

Low range position of the parts is illustrated in Fig. 2 where the drive through the low range gear 26 and 30 is communicated through the clutch collar 34 to the rear wheel and front wheel output shafts. High range position is obtained by shifting the control shaft forwardly to the position shown in Fig. 3 where the high range gear train 25 and 27 is connected with the front wheel output shaft only by the clutch collar 34. Suitable detent mechanism such as a spring pressed ball 48 cooperating with grooves 49 in the control shaft 43 may be provided to assist the operator in determining the position of the clutch collar and to retain it in its engaged positions.

The device herein disclosed is designed for driving the front wheels of the vehicle only through the high range of the auxiliary transmission but is applicable to driving the rear wheels in high range as may be desirable on some vehicles.

We claim:

1. In a four wheel drive vehicle having front and rear drive shafts, a transmission housing receiving aligned ends of said shafts, a constant mesh high range gear train and a constant mesh low range gear train in the housing, a normally rotatable driven gear in each train axially aligned with and freely rotatable on a respective one of said drive shafts, each of said drive shafts and driven gears having clutch teeth formed thereon, and a shifting collar slidable axially with respect to the shafts and having clutch teeth arranged to mesh with the clutch teeth on the high range driven gear and one drive shaft when shifted in one direction and with the clutch teeth on the low range driven gear and both drive shafts when shifted in the opposite direction.

2. In a four wheel drive vehicle having front and rear drive shafts, a transmission housing receiving aligned ends of said shafts, a constant mesh high range gear train and a constant mesh low range gear train in the housing, a normally rotatable driven gear in each train axially aligned with and freely rotatable on a respective one of said drive shafts, each of said drive shafts and driven gears having clutch teeth formed thereon, and a shifting collar slidable axially with respect to the shafts and having clutch teeth arranged to mesh with the clutch teeth on the high range driven gear and one drive shaft when shifted in one direction and with the clutch teeth on the low range driven gear and both drive shafts when shifted in the opposite direction, the clutch teeth on said shifting collar comprising an internal set and an external set, and one of said driven gears having its clutch teeth formed as an internally toothed ring to mesh with the external set on the collar while the internal set on the collar is in mesh with the clutch teeth on both drive shafts.

References Cited in the file of this patent
FOREIGN PATENTS 534,292    Great Britain _____ Mar. 4, 1941